Dec. 31, 1946.  S. N. ARNOLD  2,413,308
JOINT
Filed March 30, 1942  3 Sheets-Sheet 1

INVENTOR
STANFIELD N. ARNOLD
BY
ATTORNEY

Dec. 31, 1946.　　　　　S. N. ARNOLD　　　　　2,413,508
JOINT
Filed March 30, 1942　　　　3 Sheets-Sheet 2

Dec. 31, 1946. S. N. ARNOLD 2,413,308
JOINT
Filed March 30, 1942 3 Sheets-Sheet 3

INVENTOR
STANFIELD N. ARNOLD.
ATTORNEY

Patented Dec. 31, 1946

2,413,308

UNITED STATES PATENT OFFICE 2,413,308

JOINT

Stanfield N. Arnold, Brooklyn, N. Y., assignor to Foster Wheeler Corporation, New York, N. Y., a corporation of New York Application March 30, 1942, Serial No. 436,825

20 Claims. (Cl. 285—120)

This invention pertains to joints beween conduits and more particularly relates to a joint between conduits for fluids under relatively high pressure.

The invention provides a joint between conduits for fluids under comparatively high pressure in which an effective seal is obtained by the exerting of a high unit pressure on a sealing gasket of small surface area positioned between and cooperating with the opposing faces of connecting members of the joint which joint is so constructed that compensation for a considerable misalignment in the axes of the conduits connected may be made in the joint. The invention further provides a joint in which the connecting members joining the conduits need only be tightened against the sealing gasket sufficiently to bring the opposite sides thereof into engagement with the members when joining the conduits, the pressure thereafter contained within the conduits forcing the gasket against the opposing connecting members and forming a tight seal therebetween.

The invention will be understood from the following description when considered in connection with the accompanying drawings forming a part thereof, and in which.

Like characters of reference refer to the same or similar parts throughout the several views.

The invention will be described as used to join tubes of heat transfer apparatus through a U-bend return connection. It will, however, be understood that the joint of the present invention is capable of use in joining other conduits, or containers having therein fluid under a relatively high pressure.

Figure 1:
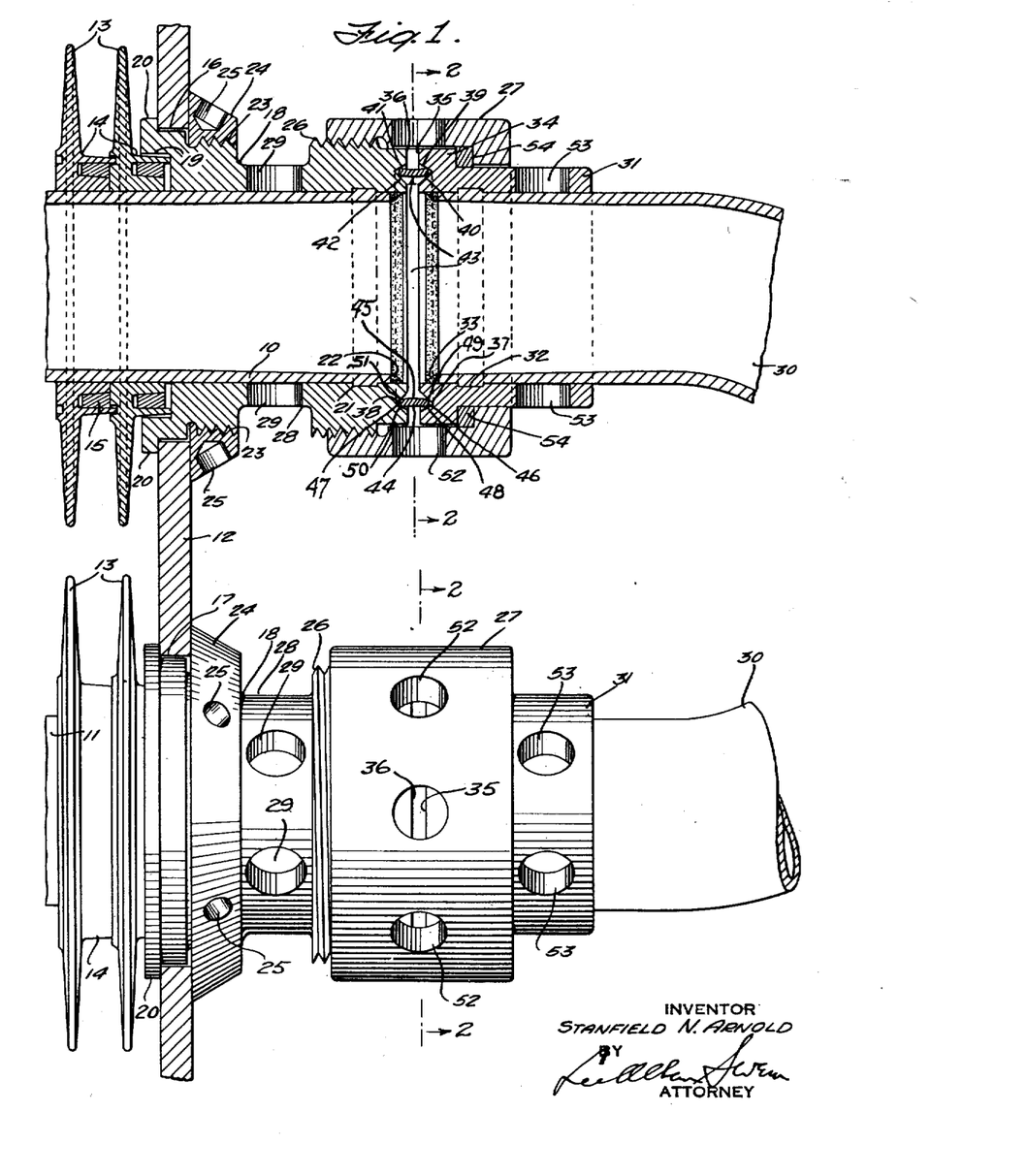
Fig. 1 is a side elevational view of two conduits included in a heat transfer apparatus and connected by a U-bend connection said connection being joined to the conduits by means of the joint of the present invention, one of said joints being shown in longitudinal section.
Figure 2:
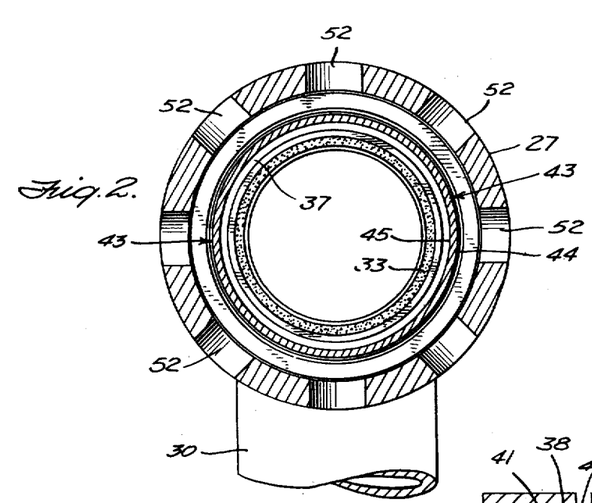
Fig. 2 is a sectional view taken on the line 2—2 of Fig. 1.

Referring to the drawings, the reference numeral 10 designates one tube of a heat transfer device while another tube is designated by the reference numeral 11. Each of the tubes, on the portion thereof within the heat transfer device which device has an outer wall 12, has thereon a plurality of extended surface discs 13 having an annular flange or hub 14 extending radially outwardly from one side of the inner peripheral portion of the disc and engaging the next disc. The extended surface discs are retained in position on the tubes by a retaining ring 15. The tubes 10 and 11 extend through apertures 16 and 17 respectively in the wall 12 which apertures have a substantially greater diameter than the diameter of the tubes.

A hub 18 is positioned on the end of each of the tubes 10 and 11 which hub extends from a point slightly beyond the end of the tubes through the apertures 16 and 17 to a point within the heat exchange device, the hub being of a lesser diameter than the apertures so that it may be passed therethrough. The end of the hub within the heat exchange device is recessed at 19 so that the hub 18 will overlap the annular hub 14 of the extended surface disc 13 nearest the wall 12. The portion of the hub 18 within the heat exchange device has an annular flange 20 thereon of a larger diameter than the apertures 16 and 17 and which is adapted to engage the inner surface of the wall 12. The tubes 10 and 11 are expanded into hubs 18, an annular projection on the tubes being forced into a recess 21 in the hub. The hubs 18 and the tubes 10 and 11 are seal welded together at the end of the tubes as shown at 22. It will be understood that other means of fastening the hubs 18 onto the tubes may be used if so desired.

A portion of each of the hubs 18 adjacent the outer surface of the wall 12 has threads 23 thereon which threads receive a bevelled flange nut 24 adapted to be tightened against the outer surface of the wall 12 and to thereby tighten the flange 20 against the inner surface of the wall 12 to securely mount the tubes 10 and 11 on the wall 12. The nut 24 has an annular row of spaced recesses 25 therein adapted to receive a spanner wrench so that the nut may be drawn tightly against the wall. A portion of the hubs 18 adjacent the end of the tubes is screw threaded at 26 to receive a union sleeve nut 27. The hub 18 has a portion 28 thereof intermediate the two screw threaded portions which is of a slightly lesser diameter than the remainder of the hub. The part 28 has an annular row of apertures 29 therein.

The tubes 10 and 11 are connected by a U-bend return connection 30 the opposite ends of which have hubs 31 fastened thereto. The hubs 31 and connection 30 are secured together in the same manner as the hubs 18 are fastened to the tubes 10 and 11. The opposite ends of the connection 30 are expanded into the hubs 31 the annular projections adjacent said ends engaging a recess 32 in the hubs. The hubs 31 are sealed to the ends of the U-bend connection by welding as shown at 33. Other means for fastening the hubs 31 on the connection may if so desired be used. The hubs 31 have a flange 34 on the end thereof adjacent the end of the connection 30 and an annular row of spaced apertures 53 therein adjacent the opposite end. The flange is of substantially the same diameter as the end portion of the hubs 18 at the end thereof adjacent the end of the tubes 10 and 11. The flange 34 extends slightly beyond the end of the connection 30 and has an inner face 35 thereon which is opposed to the inner face 36 on the end of the hubs 18 extending beyond the end of the tubes 10 and 11.

The opposing faces 35 and 36 respectively have annular grooves 37 and 38 therein. As shown, the groove 37 has opposite plane side walls 39 and 40 which converge from the face 35 into the flange toward each other while the groove 38 has opposite plane side walls 41 and 42 similar to the walls 39 and 40 of the groove 37 which walls converge toward each other from the face 36 into the hub 18.

Figure 3:
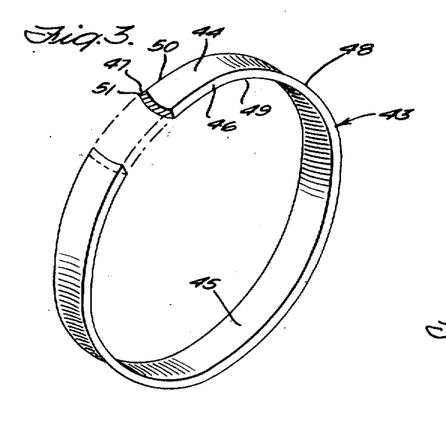
Fig. 3 is a perspective view of the sealing gasket of this invention.

An annular sealing gasket or ring 43 of a metal sufficiently flexible to yield within its elastic limit and to react when the compression is relieved is positioned between the faces 35 and 36, the opposite sides of the ring being received by the grooves 37 and 38. As shown, the ring 43 is concavo-convex in transverse section, the outer peripheral surface 44 being concave and the inner peripheral surface 45 being convex. The arc to which the surfaces 44 and 45 are formed subtend an angle of less than 180°. The opposite sides 46 and 47 of the ring extend radially in respect to the center of curvature of said arc, an outer side edge 48 being formed between the surface 44 and the side 46 and an inner side edge 49 formed between the side 46 and the inner peripheral surface 45. Outer and inner edges 50 and 51 are likewise formed between the side 47 and the outer and inner peripheral surfaces 44 and 45 respectively. When placed between the faces 35 and 36, the edges 50 and 51 engage the converging walls 41 and 42 respectively of the groove 38 in the face 36, and the edges 48 and 49 engage the converging walls 39 and 40 respectively of the groove 37 in the face 35.

The union sleeve nut 27 is adapted to tighten the joint between the connection 30 and the tubes 10 and 11 by drawing the faces 35 and 36 of the hubs 31 and 18 respectively toward one another. A friction ring 54 is interposed between the flange 34 and the adjacent end of the nut 27. The joint is tightened by turning said nut on the threads 26. For this purpose, an annular row of apertures 52 is provided which apertures are adapted to receive the movable part of a wrench by means of which the nut 27 is turned. The stationary parts of the wrench engage the apertures 29 and 53 respectively in the hubs 18 and 31. While various types of wrenches may be used for this purpose, a wrench particularly adaptable for tightening or loosening the nut 27 is fully set forth and described in my United States Letters Patent No. 2,337,538 granted December 28, 1943.

In assembling the joint of the present invention, the hubs 18 are welded or otherwise secured to the tubes 10 and 11. The tubes are then mounted in the plate 12, the end of the respective tubes extending through the apertures 16 and 17. The tubes are held in position in respect to the plate by tightening the flange nut 24 against the outer surface of the plate 12 which draws the flange 20 on the hub 18 tightly against the inner surface of the plate and holds the faces 36 aligned in a true plane. The ends of the U-bend return connection 30 are then positioned adjacent the ends of the tubes 10 and 11, the sealing ring 43 being interposed between the faces 35 and 36, the opposite sides thereof engaging the annular grooves 37 and 38 in said faces of the hubs 31 and 18 respectively. The union sleeve nut 27 is then turned on the threads 26 on the hub 18 until the outer and inner edges 50 and 51 on the side 47 of the sealing ring 43 are brought into engagement respectively with the converging walls 41 and 42 of the groove 38 and the outer and inner edges 48 and 49 of the side 46 engage the converging walls 39 and 40 of the groove 37. As the faces 35 and 36 are brought toward one another in tightening the joint, the edges of the opposite sides of the ring 43 are forced into the grooves 37 and 38, thus effecting a line contact seal between the outer edges and the adjacent walls of the grooves and the inner edges and the adjacent walls of the grooves said seals being at a point intermediate the opposite ends of said walls.

In this manner, a high unit pressure on a small gasket surface area is achieved. As the tightening pressure is increased, the ring 43 is compressed axially, since the ring is of a flexible metal, which reduces the radius of the arc to which the outer peripheral surface 44 and the inner peripheral surface 45 are formed. This increases the strength of the ring. Due to the concavo-convex shape of the ring and the flexibility of the material of which it is made, the pressure of the fluid in the tube causes an outward force on the ring causing the inner and outer peripheral edges to tightly engage the adjacent walls of the grooves 37 and 38. An increase of pressure within the tubes, therefore, increases the sealing contact between the ring and the grooves.

Figure 4:
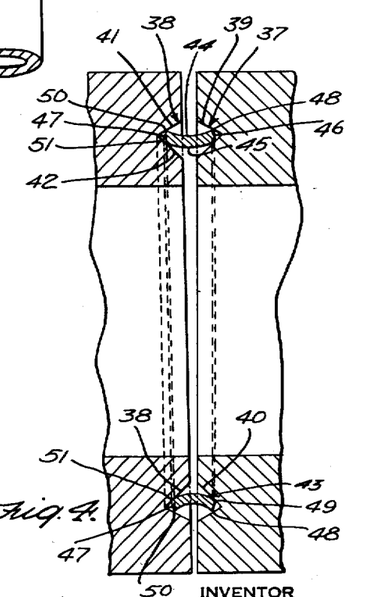
Fig. 4 is a partial longitudinal sectional view of of joint embodying the present invention between conduits the axes of which are misaligned.

The axial flexibility of the ring permits the making of an effective seal even though the gasket is out of round or slightly over or under sized. The converging faces of the grooves provide sufficient clearance so that the ring may be properly oriented therein. As shown in Fig. 4, it is possible to compensate for considerable misalignment of the axes of the tubes being joined by compressing the ring 43 more at one point than at another and thereby obtaining a tight seal.

Figure 5:
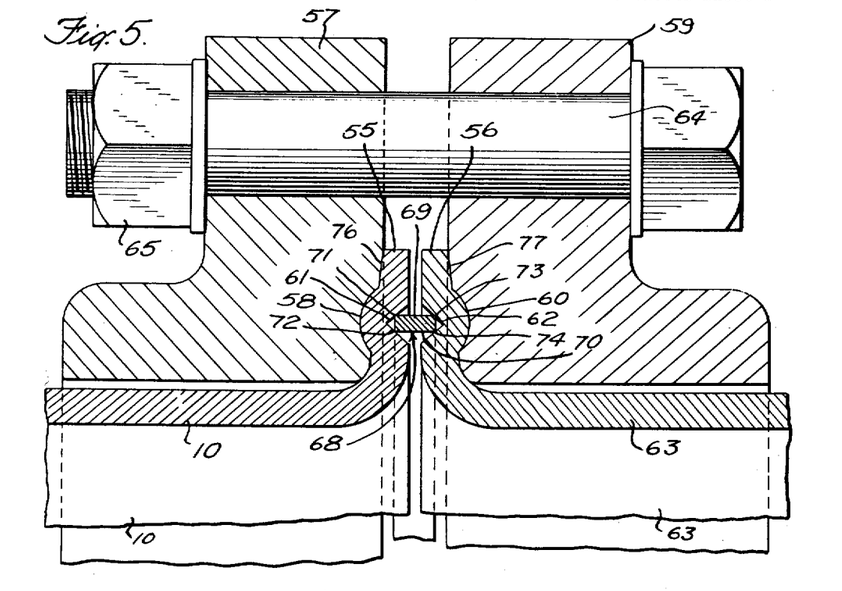
Fig. 5 is a longitudinal sectional view of a joint of the present invention in which the tube end is flanged to form a part of the joint.
Figure 7:
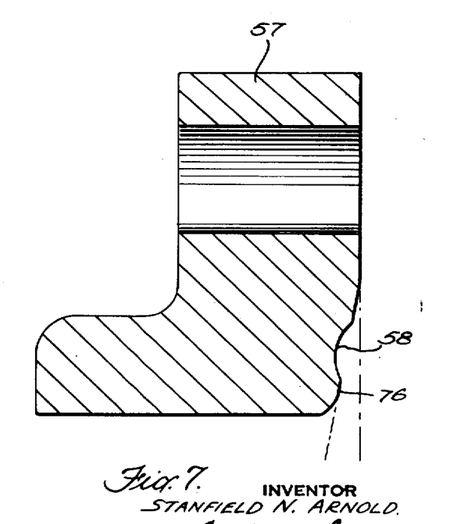
Fig. 7 is a longitudinal sectional view of a connecting member of the form of the invention shown in Fig. 5.

It will be readily understood that various tube end constructions may be used without departing from the spirit or scope of this invention. Referring to Fig. 5 the adjacent ends of the tubes 10 and 11 are bent outwardly to form a flange 55 on the tube 10 and a flange 56 on the tube 63, which flanges may be formed in the usual manner of vanstoning tube ends or by upsetting them against collars to which they are attached in forming a joint. A collar 57 having an annular groove 58 therein is disposed adjacent the flange 55 and a similar collar 59 having an annular groove 60 is disposed adjacent the flange 56. Sealing ring grooves 61 and 62 similar to the grooves 37 and 38 of the form of the invention shown in Fig. 1, are formed in the flanges 55 and 56 respectively by forcing the portion of the flanges adjacent the grooves in the collars 57 and 59 into said grooves. The grooves 58 and 60 are so proportioned as to be substantially filled by the metal displaced in forming the grooves 61 and 62 in the flanges 55 and 56 respectively. In this manner, the thickness of the tube metal is not lessened when the gasket grooves 61 and 62 are formed therein. As shown in Fig. 7, the face of the collar 57 has an inclined surface 76 extending inwardly from a point adjacent the periphery of the flange 55 and against which surface the flange abuts. The connecting member 59 has a similar inclined portion 77.

As shown in Fig. 5, a sealing ring 68 having substantially flat, parallel outer and inner peripheries 69 and 70, is positioned between the flanges 55 and 56, the opposite sides of the ring being received by the grooves 61 and 62 respectively in the same manner as the opposite sides of the ring 43 are received by the grooves 37 and 38 in the form of the invention shown in Fig. 1. If so desired, a ring of the form of ring 43 could be positioned in the grooves 61 and 62 instead of the ring 68.

When assembling the joint of the form of the invention shown in Fig. 5, the flanged ends of the tubes 10 and 63 and the collars 57 and 59 into which the flanges have been forced, are positioned in substantial horizontal alignment. The sealing ring 68 is then positioned with the opposite sides thereof in the grooves 61 and 62 and the collars are drawn together by means of the bolts and nuts 64 and 65 bringing the edges 71 and 72 of the ring 68 into contact with the converging walls of the groove 61 and the edges 73 and 74 of the opposite side of the ring into contact with the converging walls of the groove 62, thereby establishing a seal. The flanges 55 and 56 are respectively locked in the collars 57 and 59 by the forcing of the flanges into the grooves 58 and 60 by the pressure exerted on the ring 68 by tightening of the bolts and nuts 64 and 65. This forms a strong connection which will not fail except by a direct shearing of the flanges by the collars. Since the unit stress in shear at this point is only one-half the unit bursting strength, a connection of more than ample strength is provided. The positioning of the flanged tube ends into the grooves in the collars 57 and 59 also centers the tubes in respect to the collars.

Figure 6:
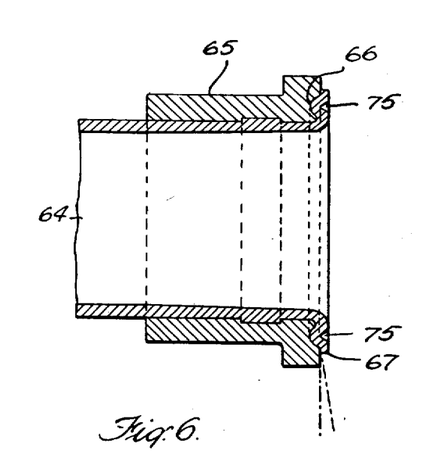
Fig. 6 is a longitudinal sectional view of a joint of the present invention in which the tube end is flanged to form a part of the joint and expanded into a collar.

In the form of the invention shown in Fig. 6, a tube 64 is shown expanded into a collar 65 which has an annular groove 66 therein. The tube end is flanged at 67 and the portion of the flange adjacent the groove 66 is forced into said groove as shown. An annular V-shaped sealing groove 75 is formed in the flange and is adapted to receive a sealing gasket 43 or a sealing gasket 68. The end of a tube, not shown, to be joined with the tube 64 would have a similar end formed thereon and the ends of the two tubes would be drawn together by any desired means to form a seal therebetween by engagement of the sealing gasket 43 or 68 with the V-shaped grooves in the flanges on the pipe ends in a manner similar to the forming of the seals in the forms of the invention illustrated in Figs. 1 to 4 and 5. The method of forming the grooves in the flanged or vanstoned ends of the tubes by forcing the metal into recessed grooves in the supporting hubs or flanges is particularly adaptable for use with tubes having relatively thin walls, since it is not necessary to upset or otherwise thicken the flange of the tube so that sufficient stock will be provided in which the sealing gasket groove may be formed. Grooves for any type of ring gasket may be formed in this manner.

In commonly used gasket joints, it is necessary in order to secure an effective seal to impose an initial stress on bolts or other means for tightening the joint sufficient to withstand the separating force due to the internal pressure in the joint and maintain a sufficiently high unit pressure on the sealing gasket to insure a tight seal. While the bolts or other tightening means are designed to carry this double stress, it is very difficult accurately to tighten the tightening means to its designed working stress. Insufficient tightening causes leakage at the joint, while tightening beyond the designed working stress or elastic limit of the tightening means causes fatigue cracks in the material and failure of the tightening means.

In the joint of the present invention, only sufficient stress need be applied to establish a sealing contact between the edges of the opposite sides of the sealing gasket with the adjacent walls of the annular sealing grooves. The tightening means is automatically stressed to the designed limit by the action of the internal pressure on the inner peripheral surface of the ring. A joint is thereby provided in which the pressure therein automatically governs the amount of sealing pressure exerted by the sealing means in the joint.

It is to be understood that changes may be made in the form, location and relative arrangement of the several parts of the devices shown and described herein without departing from the principles of the invention which is not to be limited excepting by the scope of the appended claims.

What is claimed is:

1. A resilient sealing ring having a concave outer periphery, a convex inner periphery, and opposite sides which converge toward a point outside the ring substantially equidistant between said sides.

2. A sealing ring of resilient flexible metal having a concave outer periphery, a convex inner periphery, the arcs to which said peripheries are formed having a substantially common center and opposite sides which converge radially toward said center.

3. A joint for connecting containers of fluid comprising members having adjacently opposed faces each having therein an annular groove having wall portions converging toward a point in a plane intersecting the groove and extending normally to the face, the width of the grooves decreasing in a direction away from the face, said grooves being of substantially equal dimensions and disposed in substantial coaxial relationship in said members, a sealing ring having the general configuration of the grooves and having a concave outer surface and convex inner surface spaced apart a distance less than the width of the grooves adjacent the faces but greater than the width of the grooves intermediate the opposite ends of said wall portions thereof, the ring being positioned between the members with the inner surface thereof toward the fluid pressure in said container so as to be acted upon by said fluid pressure and distended axially by the pressure, the ring engaging and exerting pressure on said wall portions of the grooves only at a point intermediate the opposite ends of the wall portions, the ring being of such width as to maintain said adjacently disposed faces out of contact with each other when the ring is in engagement with said wall portions, and means for maintaining the ring and said wall portions in said engagement.

4. A joint for connecting containers of fluid comprising members having adjacently opposed faces each having therein a continuous groove shaped to provide wall portions which converge at a substantially equal degree toward a point in a plane intersecting the groove and extending normally to the face, the width of the groove decreasing in a direction away from the face, said grooves having substantially the same dimensions and disposed in substantial coaxial relationship in said members, a sealing ring having the general configuration of the grooves and having a concave outer surface and convex inner surface spaced apart a distance less than the width of the grooves adjacent the faces but greater than the width of the grooves intermediate the opposite ends of said wall portions thereof, the ring being positioned between the members with the inner surface thereof toward the fluid pressure in said container so as to be acted upon by said fluid pressure and distended axially by the pressure, the ring engaging and exerting pressure on said wall portions of the grooves only at a point intermediate the opposite ends of the wall portions, the ring being of such width as to maintain said adjacently disposed faces out of contact with each other when the ring is in engagement with said wall portions, and means for maintaining the ring and said wall portions in said engagement.

5. A joint for connecting containers of fluid comprising members having adjacently opposed faces each having therein a continuous V-shaped groove formed by converging wall portions, said grooves having substantially the same dimensions and disposed in substantial coaxial relationship in said members, a sealing ring having the general configuration of the grooves and having a concave outer surface and convex inner surface spaced apart a distance less than the width of the grooves adjacent the faces but greater than the width of the grooves intermediate the opposite ends of said wall portions thereof, the ring being positioned between the members with the inner surface thereof toward the fluid pressure in said container so as to be acted upon by said fluid pressure and distended axially by the pressure, the ring engaging and exerting pressure on the wall portions of the grooves only at a point intermediate the opposite ends of the wall portions, the ring being of such width as to maintain said adjacently disposed faces out of contact with each other when the ring is in engagement with said wall portions, and means for maintaining the ring and said wall portions in said engagement.

6. A joint for connecting conduits of fluid comprising a member secured to each of the conduits joined, said members having adjacently opposed faces each having therein a continuous groove shaped to provide wall portions extending at an angle to the face toward a point in a plane intersecting the groove and extending normally to the face, the width of the grooves decreasing in a direction away from the face, said grooves having substantially the same dimensions and disposed in substantial coaxial relationship in said members, a sealing ring having the general configuration of the grooves and having a concave outer surface and convex inner surface spaced apart a distance less than the width of the grooves adjacent the faces but greater than the width of the grooves intermediate the opposite ends of said wall portions thereof, the ring being positioned between the members with the inner surface thereof toward the fluid pressure in said conduits so as to be acted upon by said fluid pressure and distended axially by the pressure, the ring engaging and exerting pressure on said wall portions of the grooves only at a point intermediate the opposite ends of the wall portions, the ring being of such width as to maintain said adjacently disposed faces out of contact with each other when the ring is in engagement with said wall portions, and means cooperable with said members for drawing the members toward one another to bring the ring and wall portions of the grooves into said engagement.

7. A joint for connecting conduits of fluid comprising a member secured to each of the conduits joined, the members having therein an annular row of spaced apertures, screw threads on one of said members intermediate the end thereof and the apertures, said members having adjacently opposed faces each having therein a continuous groove shaped to provide wall portions extending at an angle to the face toward a point in a plane intersecting the groove and extending normally to the face, the width of the grooves decreasing in a direction away from the face, said grooves having substantially the same dimensions and disposed in substantial coaxial relationship in said members, a sealing ring having the general configuration of the grooves and having a concave outer surface and convex inner surface spaced apart a distance less than the width of the grooves adjacent the faces but greater than the width of the grooves intermediate the opposite ends of said wall portions thereof, the ring being positioned between the members with the inner surface thereof toward the fluid pressure in said conduits so as to be acted upon by said fluid pressure and distended axially by the pressure, the ring engaging and exerting pressure on said wall portions of the grooves only at a point intermediate the opposite ends of the wall portions, the ring being of such width as to maintain said adjacently disposed faces out of contact with each other when the ring is in engagement with said wall portions, means cooperable with said members for drawing the members toward one another to bring the ring and wall portions of the grooves into said engagement, and means comprising a nut adapted to engage the threads on said one of the members and having an annular row of spaced apertures therein.

8. A joint for connecting containers of fluid under pressure comprising members having adjacently opposed faces each having therein a continuous groove shaped to provide wall portions extending at an angle to the face toward a point in a plane intersecting the groove and extending normally to the face, the width of the grooves decreasing in a direction away from the face, said grooves being of substantially equal dimensions and disposed in substantial coaxial relationship in said members, a sealing ring having the general configuration of the groove and comprising a concave outer periphery, a convex inner periphery and opposite sides which converge toward a point outside the ring substantially equidistant between said sides, said outer periphery and inner periphery being spaced apart a distance less than the width of the grooves adjacent the faces but greater than the width of the grooves intermediate the opposite ends of said wall portions thereof, the ring being positioned between the members with the inner surface thereof toward the fluid pressure in said container so as to be acted upon by said fluid pressure and distended axially by the pressure, the edges formed at the junction of said sides with the inner and outer peripheries of the ring engaging and exerting pressure on the wall portions of the groove adjacent thereto only at a point intermediate the opposite ends of the wall portions, the ring being of such width as to maintain said adjacently disposed faces out of contact with each other when the ring is in engagement with said wall portions, and means for maintaining engagement between said edges and the wall portions of said grooves.

9. In a joint of the character described, oppositely disposed flanged conduit ends, a connecting member disposed adjacent each conduit end, said members having opposing faces with each face having therein a continuous groove shaped to provide wall portions extending at an angle to the face toward a point in a plane intersecting the groove and extending normally to the face, said grooves being of substantially equal dimension and disposed in substantial coaxial relationship in said members, a continuous projection in the flanged portion of the conduit ends adapted to fit the groove in said members and having an annular sealing groove formed therein, a sealing ring having the general configuration of the groove and positioned between the flanged conduit ends and engaging the sealing grooves, and means associated with the connecting members for drawing said members and the conduit ends toward one another to bring the ring and sealing grooves into sealing engagement and lock the annular projections on said flanges in the grooves in said members.

10. In a joint of the character described, oppositely disposed flanged conduit ends, a connecting member disposed adjacent each conduit end, said members having opposing faces with each face having therein a continuous groove, said grooves being of substantially equal dimension and disposed in substantial coaxial relationship in said members, a projection in the flanged portion of the conduit ends adapted to fit the groove in said members, the projection having a continuous sealing groove formed therein shaped to provide wall portions extending at an angle to the face toward a point in a plane intersecting the groove and extending normally to the face, a sealing ring with a concave outer surface and convex inner surface, the ring having the general configuration of the grooves and being positioned between the flanged conduit ends so as to be acted upon by the fluid pressure in the joint with the opposite edges only of the ring engaging the wall portions of the said sealing grooves, and means associated with the connecting members for drawing said members and the conduit ends toward one another to bring the edges of the ring and the wall portions of the sealing grooves into engagement.

11. In a joint of the character described, oppositely disposed flanged conduit ends, a connecting member disposed adjacent each conduit end, said members having opposing faces each face having therein a continuous groove shaped to provide wall portions extending at an angle to the face toward a point in a plane intersecting the groove and extending normally to the face, said grooves being of substantially equal dimension and disposed in substantial coaxial relationship in said members, said flanged portion of the conduit ends each having a continuous sealing groove therein formed by forcing into the grooves in the connecting members the portion of the flanged conduit ends adjacent thereto, a sealing ring having the general configuration of the grooves and comprising a concave outer surface and a convex inner surface, the ring being positioned between the flanged conduit ends so as to be acted upon by the fluid pressure in the joint, the opposite walls of the ring engaging the adjacent wall portions of said sealing grooves, and means associated with the connecting members for drawing said members and the conduit ends toward one another to bring the edges of the ring and the wall portions of the sealing grooves into engagement and thereby hold the conduits and the connecting members in relation to one another.

12. In a joint of the character described, oppositely disposed flanged conduit ends, a connecting member disposed adjacent each conduit end, said members having opposing faces each face having therein a continuous groove shaped to provide wall portions extending at an angle to the face toward a point in a plane intersecting the groove and extending normally to the face, said grooves being of substantially equal dimension and disposed in substantial coaxial relationship in said members, means for securing each member and the adjacent conduit together comprising a continuous projection in the flanged portion of the conduit ends adapted to fit the groove in said member with the projection having an annular sealing groove formed therein, a sealing ring having the general configuration of the grooves and comprising a concave outer surface and convex inner surface, the ring being positioned between the flanged conduit ends so as to be acted upon by the fluid pressure in the joint, the opposite edges of the ring engaging the wall portions of said sealing grooves, and means associated with the connecting members for drawing said members and the conduit ends toward one another to bring the edges of the ring and the wall portions of the sealing grooves into engagement and secure the annular projection in the conduit ends in the groove in said member.

13. In a joint of the character described, oppositely disposed metallic flanged conduit ends, each of said flanges having a sealing groove pressed therein, the metal displaced by formation of said groove providing a projection on the opposite face of said flange, said grooves being shaped to provide wall portions extending at an angle to the face toward a point in a plane intersecting the groove and extending normally to the face, said grooves having substantially the same dimensions and disposed in substantial coaxial relationship in said members, a sealing ring having the general configuration of the grooves, the edges only of the opposite sides of which engage substantially the same dimensions and are disposed in substantial coaxial relationship in the flanges, a connecting member disposed adjacent each conduit end, said members having opposing faces with a continuous groove therein adapted to receive the projection on the opposite face of the flanges, a sealing ring having the general configuration of the grooves positioned between the flanged conduit ends with the opposite sides of said ring engaging the sealing grooves, and means associated with the connecting members for drawing said members and the conduit ends toward one another to bring the ring and sealing grooves into engagement and lock the annular projections on said flanges in the grooves in said members.

14. In a joint of the character described, oppositely disposed metallic flanged conduit ends, each of said flanges having a sealing groove pressed therein, the metal displaced by formation of said groove providing a projection on the opposite face of said flange, said grooves being shaped to provide wall portions extending at an angle to the face toward a point in a plane intersecting the groove and extending normally to the face, the grooves having substantially equal dimensions and disposed in substantial coaxial relationship in the flanges, a connecting member disposed adjacent each conduit end, said members having opposing faces with a continuous groove therein adapted to receive the projection on the opposite face of the flanges, a sealing ring having the general configuration of the grooves and comprising a concave outer periphery, a convex inner periphery, and opposite sides which converge toward a point outside the ring substantially equidistant between said sides, the ring being adapted to be positioned between the flanged conduit ends, and means associated with the connecting members for drawing said members and the conduit ends toward one another to bring the edges of the ring and wall portions of the sealing grooves into engagement and lock the annular projections on said flanges in the grooves in said members.

15. A joint for connecting containers of fluid under pressure comprising adjacently opposed members one of which has a continuous groove shaped to provide wall portions extending at an angle to the face toward a point in a plane intersecting the groove and extending normally to the face, the width of the grooves decreasing in a direction away from the face, said grooves being of substantially the same dimensions and disposed in substantial coaxial relationship in said members, a sealing ring having the general configuration of the grooves and having a concave outer surface and convex inner surface spaced apart a distance less than the width of the grooves adjacent the faces but greater than the width of the grooves intermediate the opposite ends of said wall portions thereof, the ring being positioned between the members with the inner surface thereof toward the fluid pressure in said container so as to be acted upon by said fluid pressure and distended axially by the pressure, the edges only at the extremities of a peripheral surface being in engagement and exerting pressure on the adjacent wall portions of said grooves only at a point intermediate the opposite ends of the wall portions, the ring being of such width as to maintain said adjacently disposed members out of contact with each other when the ring is in engagement with said wall portions, and means for maintaining the edges of the ring and the wall portions of the grooves in engagement.

16. A joint for connecting containers of fluid under pressure comprising adjacently opposed members each having therein an annular groove shaped to provide wall portions extending at an angle to the face toward a point in a plane intersecting the groove and extending normally to the face, the width of the grooves decreasing in a direction away from the face, said grooves being of substantially equal diameter and disposed in substantial coaxial relationship in said members, a sealing ring having a concave outer surface and a convex inner surface spaced apart a distance less than the width of the grooves adjacent the faces but greater than the width of the grooves intermediate the opposite ends of said wall portions thereof, the ring being positioned between the members with the inner surface thereof toward the fluid pressure in said container so as to be acted upon by the fluid pressure in the joint and distended axially by said pressure, the opposite edges only of the ring engaging and exerting pressure on the wall portions of said grooves only at a point intermediate the opposite ends of the wall portions, the ring being of such width as to maintain said adjacently disposed members out of contact with each other when the ring is in engagement with said wall portions, and means for maintaining the edges of the ring and the wall portions of the grooves in engagement.

17. A joint for connecting containers of fluid under pressure comprising adjacently opposed members each having therein an annular groove shaped to provide wall portions extending at an angle to the face toward a point in a plane intersecting the groove and extending normally to the face, the width of the grooves decreasing in a direction away from the face, said grooves being of substantially equal diameter and disposed in substantial coaxial relationship in said members, a sealing ring of flexible metal having a concave outer surface and a convex inner surface spaced apart a distance less than the width of the grooves adjacent the faces but greater than the width of the grooves intermediate the opposite ends of said wall portions thereof, the ring being positioned between the members with the inner surface thereof toward the fluid pressure in said container so as to be acted upon by the fluid pressure in the joint and distended axially by said pressure, the opposite edges only of the ring engaging and exerting pressure on the wall portions of said grooves only at a point intermediate the opposite ends of the wall portions, the ring being of such width as to maintain said adjacently disposed members out of contact with each other when the ring is in engagement with said wall portions, and means for maintaining the edges of the ring and the wall portions of the grooves in engagement.

18. A joint for connecting containers of fluid comprising members having adjacently opposed faces each having therein a continuous groove shaped to provide wall portions extending at an angle to the face toward a point in a plane intersecting the groove and extending normally to the face, the width of the grooves decreasing in a direction away from the face, said grooves having substantially the same dimensions and disposed in substantial coaxial relationship in said members, a sealing ring having the general configuration of the grooves and having a concave outer surface and convex inner surface spaced apart a distance less than the width of the grooves adjacent the faces but greater than the width of the grooves intermediate the opposite ends of said wall portions thereof, the ring being positioned between the members with the inner surface thereof toward the fluid pressure in said container so as to be acted upon by said fluid pressure and distended axially by the pressure, said ring being in engagement and exerting pressure on the walls of the grooves adjacent said edge, and means for maintaining the ring and said wall portions in said engagement.

19. A joint for connecting containers of fluid comprising members having adjacently opposed faces each having therein a continuous groove shaped to provide wall portions extending at an angle to the face toward a point in a plane intersecting the groove and extending normally to the face, the width of the grooves decreasing in a direction away from the face, said grooves having substantially the same dimensions and disposed in substantial coaxial relationship in said members, a sealing ring having a concave outer surface and a convex inner surface spaced apart a distance less than the width of the grooves adjacent the faces but greater than the width of the grooves intermediate the opposite ends of said wall portions thereof, the ring being positioned between the members with the inner surface thereof toward the fluid pressure in said container so as to be acted upon by the fluid pressure in the joint and distended axially by said pressure, the ring engaging and exerting pressure on the wall portions of said grooves only at a point intermediate the opposite ends of the wall portions, the ring being of such width as to maintain said adjacently disposed faces out of contact with each other when the ring is in engagement with said wall portions, and means for maintaining the ring and the wall portions of the grooves in said engagement.

20. A joint for connecting containers of fluid comprising members having adjacently opposed faces each having therein a continuous groove shaped to provide wall portions extending at an angle to the face toward a point in a plane intersecting the groove and extending normally to the face, the width of the grooves decreasing in a direction away from the face, said grooves having substantially the same dimensions and disposed in substantial coaxial relationship in said members, a sealing ring having the general configuration of the grooves and having a concave outer surface and convex inner surface spaced apart a distance less than the width of the grooves adjacent the faces but greater than the width of the grooves intermediate the opposite ends of said wall portions thereof, the ring being positioned between the members with the inner surface thereof toward the fluid pressure in said container so as to be acted upon by said fluid pressure and distended axially by the pressure, each of the opposite sides of which ring extend in a plane at substantially right angles to the axis of the ring, the edges only of said opposite sides engaging the wall portions of the grooves at a point intermediate the opposite ends of the wall portions, the ring being of such width as to maintain said adjacently disposed faces out of contact with each other when the ring is in engagement with said wall portions, and means for maintaining the edges of the ring and said wall portions in engagement.

STANFIELD N. ARNOLD.

Certificate of Correction

Patent No. 2,413,308.

December 31, 1946.

STANFIELD N. ARNOLD

It is hereby certified that errors appear in the printed specification of the above numbered patent requiring correction as follows: Column 4, line 48, for "tube" read *tubes*; column 6, line 49, claim 2, strike out "flexible"; column 7, line 15, claim 4, for "groove" read *grooves*; and that the said Letters Patent should be read with these corrections therein that the same may conform to the record of the case in the Patent Office.

Signed and sealed this 13th day of May, A. D. 1947.

[SEAL]

LESLIE FRAZER,
*First Assistant Commissioner of Patents.* in said container so as to be acted upon by said fluid pressure and distended axially by the pressure, said ring being in engagement and exerting pressure on the walls of the grooves adjacent said edge, and means for maintaining the ring and said wall portions in said engagement.

19. A joint for connecting containers of fluid comprising members having adjacently opposed faces each having therein a continuous groove shaped to provide wall portions extending at an angle to the face toward a point in a plane intersecting the groove and extending normally to the face, the width of the grooves decreasing in a direction away from the face, said grooves having substantially the same dimensions and disposed in substantial coaxial relationship in said members, a sealing ring having a concave outer surface and a convex inner surface spaced apart a distance less than the width of the grooves adjacent the faces but greater than the width of the grooves intermediate the opposite ends of said wall portions thereof, the ring being positioned between the members with the inner surface thereof toward the fluid pressure in said container so as to be acted upon by the fluid pressure in the joint and distended axially by said pressure, the ring engaging and exerting pressure on the wall portions of said grooves only at a point intermediate the opposite ends of the wall portions, the ring being of such width as to maintain said adjacently disposed faces out of contact with each other when the ring is in engagement with said wall portions, and means for maintaining the ring and the wall portions of the grooves in said engagement.

20. A joint for connecting containers of fluid comprising members having adjacently opposed faces each having therein a continuous groove shaped to provide wall portions extending at an angle to the face toward a point in a plane intersecting the groove and extending normally to the face, the width of the grooves decreasing in a direction away from the face, said grooves having substantially the same dimensions and disposed in substantial coaxial relationship in said members, a sealing ring having the general configuration of the grooves and having a concave outer surface and convex inner surface spaced apart a distance less than the width of the grooves adjacent the faces but greater than the width of the grooves intermediate the opposite ends of said wall portions thereof, the ring being positioned between the members with the inner surface thereof toward the fluid pressure in said container so as to be acted upon by said fluid pressure and distended axially by the pressure, each of the opposite sides of which ring extend in a plane at substantially right angles to the axis of the ring, the edges only of said opposite sides engaging the wall portions of the grooves at a point intermediate the opposite ends of the wall portions, the ring being of such width as to maintain said adjacently disposed faces out of contact with each other when the ring is in engagement with said wall portions, and means for maintaining the edges of the ring and said wall portions in engagement.

STANFIELD N. ARNOLD.

Certificate of Correction

Patent No. 2,413,308.    December 31, 1946.

STANFIELD N. ARNOLD

It is hereby certified that errors appear in the printed specification of the above numbered patent requiring correction as follows: Column 4, line 48, for "tube" read *tubes*; column 6, line 49, claim 2, strike out "flexible"; column 7, line 15, claim 4, for "groove" read *grooves*; and that the said Letters Patent should be read with these corrections therein that the same may conform to the record of the case in the Patent Office.

Signed and sealed this 13th day of May, A. D. 1947.

[SEAL]

LESLIE FRAZER,
*First Assistant Commissioner of Patents.*